(12) United States Patent
Sjoholm et al.

(10) Patent No.: US 6,506,038 B2
(45) Date of Patent: Jan. 14, 2003

(54) WEAR-PREVENTING AND POSITIONING DEVICE FOR A SCREW COMPRESSOR

(75) Inventors: Lars Ivan Sjoholm, Burnsville, MN (US); Lee John Erickson, Eagan, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/930,550

(22) Filed: Aug. 15, 2001

(65) Prior Publication Data

US 2002/0037229 A1 Mar. 28, 2002

Related U.S. Application Data

(60) Provisional application No. 60/225,408, filed on Aug. 15, 2000.

(51) Int. Cl.$^7$ ............................................. F04C 18/16
(52) U.S. Cl. ........................... 418/201.1; 29/888.023; 384/126; 384/537; 384/903
(58) Field of Search .................... 418/201.1, 201.2; 29/888.023; 384/126, 537, 903

(56) References Cited

U.S. PATENT DOCUMENTS

| | | | | |
|---|---|---|---|---|
| 2,243,874 A | * | 6/1941 | Lysholm .................. | 418/201.1 |
| 3,151,806 A | | 10/1964 | Whitfield ................. | 418/201.2 |
| 3,610,787 A | * | 10/1971 | Borisoglebsky et al. . | 418/201.1 |
| 4,478,054 A | | 10/1984 | Shaw et al. .............. | 418/201.2 |
| 4,662,190 A | | 5/1987 | Tischer .................... | 62/470 |
| 4,913,565 A | | 4/1990 | Englund ................... | 384/617 |
| 5,246,357 A | | 9/1993 | Sjoholm et al. .......... | 418/97 |
| 5,509,273 A | | 4/1996 | Lakowske et al. ....... | 418/201.2 |
| 5,722,163 A | | 3/1998 | Grant et al. .............. | 384/626 |
| 5,975,867 A | | 11/1999 | Grant et al. .............. | 418/201.1 |
| 5,979,168 A | | 11/1999 | Beekman ................. | 418/201.2 |

FOREIGN PATENT DOCUMENTS

| | | | | |
|---|---|---|---|---|
| GB | 1171191 | | 11/1969 | |
| JP | 5-133360 | * | 5/1993 | ............. 418/201.1 |
| RU | 1105692 | * | 7/1984 | ............. 418/201.1 |

* cited by examiner

Primary Examiner—John J. Vrablik
(74) Attorney, Agent, or Firm—Michael Best & Friedrich LLP

(57) ABSTRACT

A screw compressor includes a suction end, a discharge end, first and second rotors mounted for rotation between the suction end and the discharge end, and a discharge housing at the discharge end. The discharge housing surrounds a portion of the first and second rotors and includes an end surface. The compressor further includes a first axial bearing supporting the first rotor, and a wear-preventing member sandwiched between the end surface of the discharge housing and the first axial bearing such that no portion of the first axial bearing contacts the end surface. The screw compressor further includes a first radial bearing in the discharge housing for supporting the first rotor. The wear-preventing member includes a face abutting the end surface of the discharge housing and abutting at least a portion of the first radial bearing to retain the first radial bearing in the discharge housing.

22 Claims, 3 Drawing Sheets

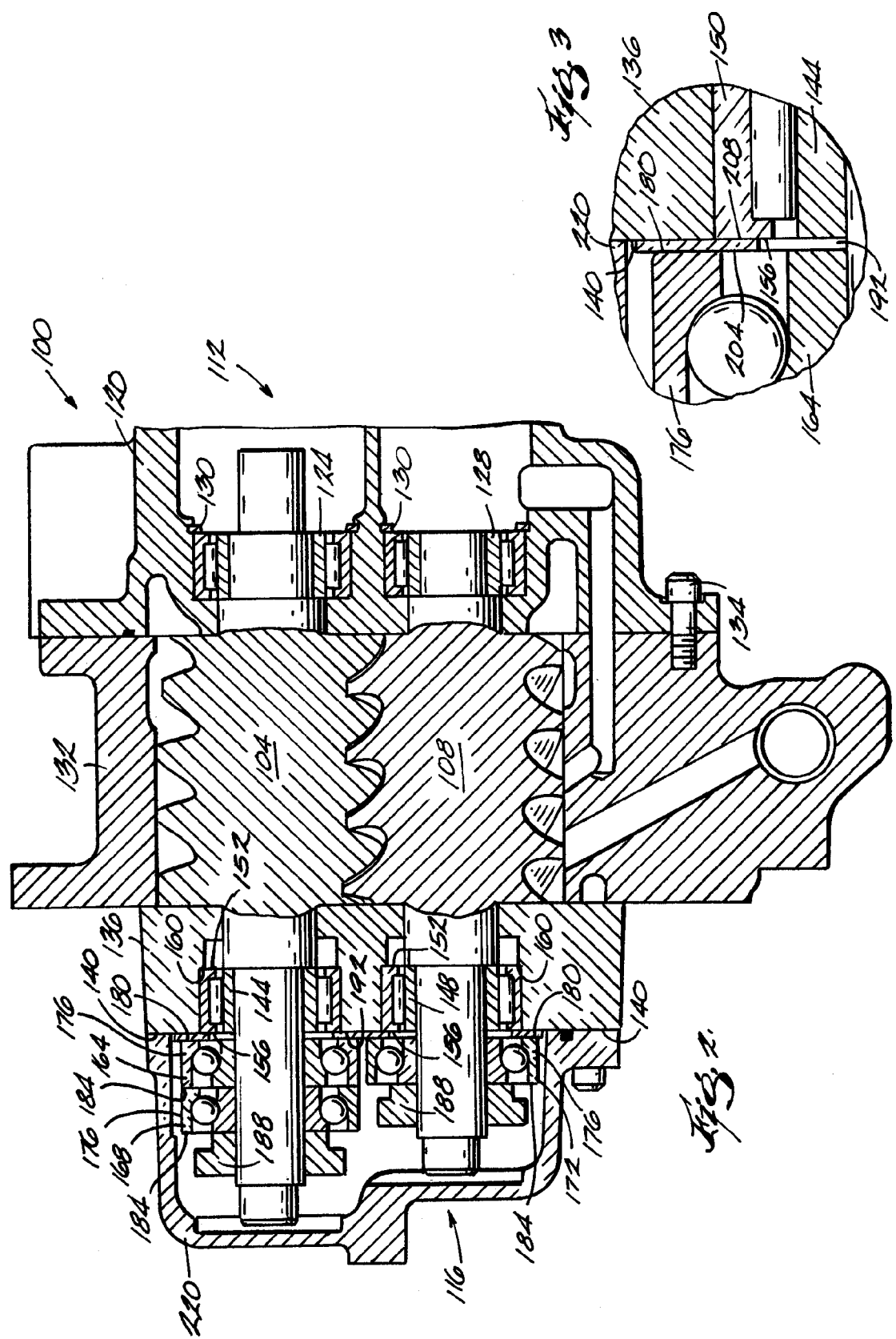

US 6,506,038 B2

WEAR-PREVENTING AND POSITIONING DEVICE FOR A SCREW COMPRESSOR

RELATED APPLICATIONS

This application claims priority to provisional application Ser. No. 60/225,408, filed on Aug. 15, 2000.

FIELD OF THE INVENTION

The invention relates to screw compressors, and more particularly to bearing arrangements for screw compressors.

BACKGROUND OF THE INVENTION

The rotors of a screw compressor are supported by bearings at both the suction end and the discharge end of the compressor. In a typical bearing arrangement, there is one radial bearing supporting each end of the rotor and at least one axial bearing supporting the discharge end of the rotor. This arrangement is used for both rotors. FIG. 1 illustrates a typical prior art bearing arrangement for a screw compressor 10.

As shown in FIG. 1, the compressor 10 includes two rotors 14 and 18 mounted for rotation between a suction end 22 and a discharge end 26. At the suction end 22, the first and second rotors 14, 18 are housed in a suction housing 30 and are supported by radial bearings 34 and 38. The suction housing 30 is connected to one end of a rotor housing 42 that surrounds portions of the rotors 14, 18. A discharge housing 46 is connected to the other end of the rotor housing 42. Radial bearings 50 and 54 support the discharge ends of the rotors 14, 18 inside the discharge housing 46.

Typically, each of the radial bearings 34, 38, 50, and 54 are rolling element bearings. When mounted, the separable inner race of each bearing 34, 38, 50, and 54 is pressed onto the ends of the respective rotor shafts, while the outer race with the rollers is retained in the respective suction housing 30 or discharge housing 46. Due to the tolerances, the fit between the outer race of the bearings 34 and 38 and the suction housing 30 is often a transition fit (slip fit and press fit), so it is common to axially fix each outer race between a shoulder 58 of the suction housing 30 on one end, and a snap ring 59 on the other end.

Likewise, the fit between the outer race of the bearings 50 and 54 and the discharge housing 46 is often a slip fit, so each outer race is axially fixed between a shoulder 60 on one end, and a snap ring 61 on the other end. The snap rings 59 and 61 are retained in grooves that are cast or machined in the respective suction housing 30 and discharge housing 46.

To accommodate the axial movement of the rotors 14, 18, axial bearings 66, 70, and 74 are used at the discharge end 26. Two of the axial bearings 66 and 70 are mounted in tandem relation on the first rotor 14, while the second rotor 18 has only one of the axial bearing 74 mounted thereon. Just as with the radial bearings 50, 54, the inner races of the axial bearings 66, 70, and 74 are pushed onto the respective rotor shafts, and the outer races are free to rotate. The axial bearings 66 and 70 are axially fixed between an end surface 78 of the discharge housing 46 on one end, and a thrust collar 82 on the other end. The thrust collar 82 is shrunk onto the rotor shaft, as is understood by those skilled in the art. Likewise, the axial bearing 74 is axially fixed between the end surface 78 on one end, and a thrust collar 86 on the other end.

The compressor 10 can also include a pair of reverse-thrust or backup bearings 90. The backup bearings 90 each have a spring-loaded outer race, in the form of a spring 91 that is retained between the bearing 90 and a cup 92, that biases the backup bearings 90 into engagement with a step in the respective rotors 14, 18. This spring bias is intended to keep the outer races of the axial bearings 66 and 74 securely seated against the end surface 78 during startup of the compressor 10, thereby substantially preventing any relative rotation or movement between the outer races of the axial bearings 66 and 74 and the end surface 78. While also serving other purposes, this backup bearing arrangement eliminates the need to mechanically anti-rotate the outer races of the axial bearings 66 and 74 with pins, keys, or other known anti-rotation devices. An axial bearing cover 94 is mounted to the end surface 78 of the discharge housing 46 to cover and protect the axial bearings 66, 70, 74, and 90 and to provide a fixed engagement surface for the spring-loaded backup bearings 90.

SUMMARY OF THE INVENTION

The prior-art bearing arrangement described above has some drawbacks. For example, when the compressor 10 is started, the spring bias of the backup bearings 90 is often not enough to keep the outer races of the bearings 66 and 74 seated securely against the end surface 78 of the discharge housing 46. This allows the outer races of the bearings 66 and 74 to rotate or vibrate relative to the end surface 78 of the discharge housing 46. Because the end surface 78 is typically a softer material (e.g., cast iron) than the material used for the outer race of the bearings 66 and 74 (e.g., steel), the rotation and vibration of the bearings 66 and 74 results in wearing and grooving in the end surface 78. The wearing and grooving can be further accentuated by non-perfect parallel seating of the bearings 66 and 74 against the end surface 78. Testing has shown wear rates on the order of one micrometer per one-thousand hours of compressor operation.

Large amounts of wearing and grooving result in increased axial rotor endplay with respect to the end surface 78 of the discharge housing 46. The increased axial end-play results in a loss of compressor performance and increased discharge temperatures, both of which decrease the overall efficiency of the compressor 10.

Using backup bearings 90 also creates other disadvantages. For example, the compressor 10 must be larger to accommodate the backup bearings 90, and the backup bearings 90 add to the overall cost of the compressor 10. These disadvantages, while tolerable if the backup bearings 90 perform as intended, are exacerbated when the backup bearings 90 fail to prevent the wearing and grooving that causes increased axial rotor end-play. Of course, the size of the backup bearings 90 can be increased to include a larger spring force to eliminate wearing and grooving, however, such larger backup bearings would reduce the life of the axial bearings 66, 70, and 74 due to the larger thrust force.

The present invention overcomes these and other problems by providing a wear-preventing and positioning device for combined axial and radial bearing arrangements in the discharge end of a compressor. The device substantially eliminates wearing and grooving on the discharge housing without the use of spring-loaded backup bearings or other anti-rotation devices coupled to the outer races of the axial bearings. Therefore, the overall size and cost of the compressor is greatly reduced. The single device also axially positions the radial bearings and the axial bearings on the discharge side. Therefore, the snap rings are also eliminated, further reducing the size and cost of the compressor.

The device is a thin, hard, specially-configured and flattened strip of material that fits over both rotor shafts and abuts the end surface of the discharge housing. One face of the strip axially fixes the radial bearings while the opposing face axially fixes the axial bearings. The strip is sandwiched between the outer race of the axial bearings and the end surface of the discharge housing to eliminate direct contact between the axial bearings and the discharge housing. Because the strip is approximately the same hardness as the material used for the outer races of the axial bearings, rotation or vibration of the axial bearings will not create significant wearing or grooving in the strip. The need for spring-loaded backup bearings to prevent rotation of the axial bearings is therefore eliminated.

Additionally, the special configuration of the strip substantially fixes the strip with respect to the discharge housing so that any movement or vibration of the axial bearings will not cause relative movement between the strip and the discharge housing. This substantially eliminates wear on the discharge housing, thereby eliminating the potential for increased axial rotor end-play.

More specifically, the invention provides a screw compressor including a suction end, a discharge end, first and second rotors mounted for rotation between the suction end and the discharge end, and a discharge housing at the discharge end. The discharge housing surrounds a portion of the first and second rotors and includes an end surface. The compressor further includes a first axial bearing supporting the first rotor, and a wear-preventing member sandwiched between the end surface of the discharge housing and the first axial bearing such that no portion of the first axial bearing contacts the end surface.

In another aspect of the invention, the compressor further includes a second axial bearing supporting the second rotor. The wear-preventing member is also sandwiched between the end surface of the discharge housing and the second axial bearing such that no portion of the second axial bearing contacts the end surface.

In yet another aspect of the invention, the screw compressor further includes a first radial bearing in the discharge housing for supporting the first rotor. The first radial bearing has a suction-side face and a discharge-side face, the suction-side face being seated in the discharge housing. The wear-preventing member includes a first face abutting the end surface of the discharge housing and abutting at least a portion of the discharge-side face of the first radial bearing to retain the first radial bearing in the discharge housing.

In another aspect of the invention, the screw compressor also includes a second radial bearing in the discharge housing for supporting the second rotor. The second radial bearing has a suction-side face and a discharge-side face, the suction-side face being seated in the discharge housing. The first face of the wear-preventing member abuts at least a portion of the discharge-side face of the second radial bearing to retain the second radial bearing in the discharge housing. Preferably, the wear-preventing member is substantially figure-eight-shaped.

The invention also provides a method of assembling a screw compressor having first and second rotors and a discharge housing surrounding a portion of the first and second rotors. The discharge housing includes an end surface. The method includes inserting first and second radial bearings into the discharge housing to support the respective first and second rotors, placing a wear-preventing and positioning device against the end surface of the discharge housing to retain the radial bearings in the discharge housing, and mounting first and second axial bearings on the respective first and second rotors such that the first and second axial bearings abut the wear-preventing and positioning device. The wear-preventing and positioning device substantially prevents engagement between the first and second axial bearings and the end surface of the discharge housing.

Other features and advantages of the invention will become apparent to those skilled in the art upon review of the following detailed description, claims, and drawings.

BRIEF DESCRIPTION OF THE DRAWINGS

FIG. 2 is a section view of a screw compressor embodying the invention.

FIG. 3 is an enlarged view showing the wear-preventing and positioning device in the screw compressor.

Figure 1:
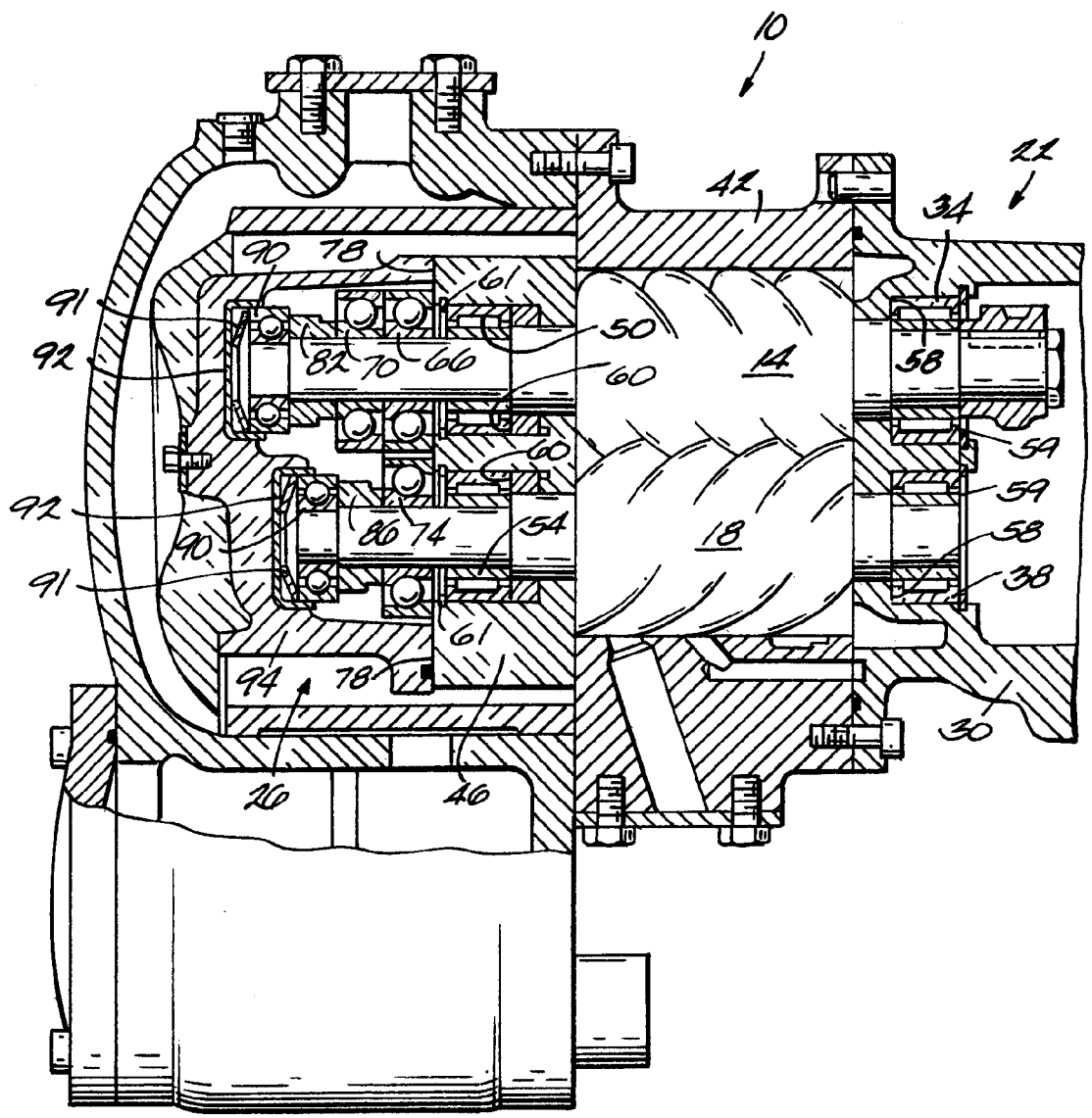
FIG. 1 is a section view of a prior art screw compressor arrangement.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 2 illustrates a screw compressor 100 embodying the present invention. The screw compressor 100 includes first and second rotors 104 and 108 mounted for rotation between a suction end 112 and a discharge end 116. The rotors 104 and 108 have corresponding concave and convex profiles that cooperate in a known manner to compress a fluid (not shown) as the fluid moves from the suction end 112 to the discharge end 116 via rotation of the rotors 104 and 108. At the suction end 112, the rotors 104 and 108 are housed in a suction housing 120 and are supported by radial bearings 124 and 128, respectively, that are housed in the suction housing 120. The radial bearings 124 and 128 can be rolling-element bearings or sleeve bearings, and are held in place in the suction housing 120 using snap rings 130 or other suitable retention devices. In the illustrated embodiment, the radial bearings 124 and 128 are needle-roller bearings.

A rotor housing 132 houses the working portions of the rotors 104 and 108. The rotor housing 132 is coupled to the suction housing 120 using suitable fasteners 134 (only one is shown). The discharge end 116 of the compressor 100 includes a discharge housing 136. The discharge housing 136 is adjacent the other end of the rotor housing 132, opposite the suction housing 120. The discharge housing includes an end surface 140 facing the discharge end 116 of the compressor 100. The discharge housing is typically made from cast iron.

At the discharge end 116, the rotors 104 and 108 are supported by radial bearings 144 and 148, respectively, that are housed in the discharge housing 136. Again, the radial bearings 144 and 148 can be rolling-element bearings or sleeve bearings, and in the illustrated embodiment, the radial bearings 144 and 148 are needle-roller bearings. Each of the radial bearings 144 and 148 includes an outer race 150 having a suction-side face 152 and an opposite discharge-side face 156.

The radial bearings 144 and 148 are each seated in the discharge housing 136 such that the respective suction-side faces 152 each abut a shoulder 160 formed in the discharge housing 136. The engagement between the suction-side faces 152 and the shoulders 160 position the radial bearings 144 and 148 axially in the discharge housing 136 so that the radial bearings 144 and 148 cannot move toward the suction end 112 of the compressor 100. When the radial bearings 144 and 148 are seated in the discharge housing 136, the respective discharge-side faces 156 are substantially aligned with, and in substantially the same plane as, the end surface 140.

The compressor 100 also includes axial bearings 164, 168, and 172 mounted on the discharge-end of the rotors 104 and 108 to support the rotors 104 and 108 with respect to movement in the axial direction, as is known to those skilled in the art. In the illustrated embodiment, two axial bearings 164 and 168 are mounted in a tandem arrangement on the rotor 104 and one axial bearing 172 is mounted on the rotor 108. The axial bearings 164, 168, and 172 can be angular-contact ball bearings, tapered roller bearings, spherical roller thrust bearings, four-point contact ball bearings, thrust ball bearings, cylindrical-roller thrust bearings, needle-roller thrust bearings, deep-groove ball bearings, or other non-rolling element type bearings. In the illustrated embodiment, the axial bearings 164, 168, and 172 are shown as angular-contact ball bearings. Each of the axial bearings 164, 168, and 172 includes an outer race 176 having a suction-side face 180 and an opposite discharge-side face 184.

Each rotor 104 and 108 has a thrust collar 188 mounted thereon to cooperate with the axial bearings 168 and 172 in a manner known to those skilled in the art. The thrust collars 188 axially position the axial bearings 164, 168, and 172 on the rotors 104 and 108 so that the axial bearings 164, 168, and 172 cannot move toward the discharge end 116 of the compressor 100.

The compressor 100 further includes a wear-preventing and positioning member or device 192 that functions to axially position the radial bearings 144, 148, and the axial bearings 164, 168, and 172. In addition, the device 192 also functions to prevent wearing and grooving of the end surface 140 of the discharge housing 136, thereby reducing or eliminating the axial rotor end play previously encountered with prior-art compressors. The term "axial rotor end play" refers to the amount or range of axial-direction movement available to the rotors 104 and 108. In prior art compressors (see FIG. 1), the wearing or grooving that would occur in the end surface 78 would, over time, increase the axial rotor end play of the prior art compressor 10, resulting in decreased compressor performance and increased discharge temperatures.

Figure 5:
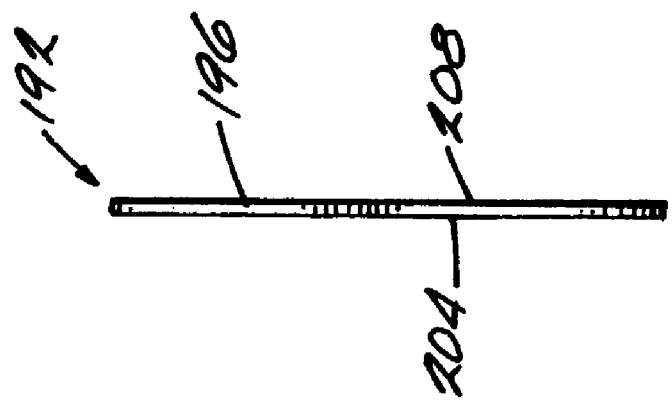
FIG. 5 is a side view of the wear-preventing and positioning device of FIG. 4.
Figure 4:
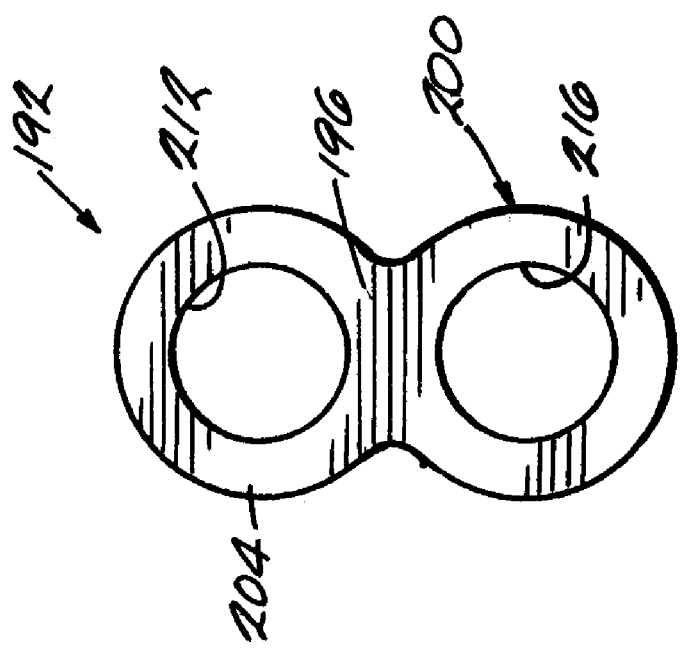
FIG. 4 is front view showing the wear-preventing and positioning device of FIG. 2.

As seen in FIGS. 4 and 5, the wear-preventing and positioning device 192 is a thin, substantially flat, and substantially figure-eight-shaped piece of material. The device 192 has a body portion 196 defined by a figure-eight shaped perimeter 200. The body portion 196 has a first, or discharge-side face 204, and a second, or suction-side face 208. First and second openings or apertures 212 and 216, respectively, extend between the opposing faces 204 and 208. The openings 212 and 216 are substantially circular and are sized to fit over respective portions of the rotors 104 and 108.

As shown in FIGS. 2 and 3, the wear-preventing and positioning device 192 is positioned over the rotors 104 and 108 so that the suction-side face 208 abuts the end surface 140 of the discharge housing 136. As best seen in FIG. 3, the suction-side face 208 of the wear-preventing and positioning device 192 also engages at least a portion of the discharge-side faces 156 of the radial bearings 144 and 148, so that the radial bearings 144 and 148 cannot move toward the discharge end 116 of the compressor 100. Therefore, the device 192 functions to axially position the radial bearings 144 and 148 in the discharge housing 136. No snap rings are required to axially locate the radial bearings 144 and 148, and therefore, no extra machining step is required to form a groove for the snap rings.

When mounted over the rotors 104 and 108 as described above, the device 192 also functions to axially locate the axial bearings 164, 168, and 172. As shown in FIGS. 2 and 3, the discharge-side face 204 of the wear-preventing and positioning device 192 engages at least a portion of the suction-side faces 180 of the axial bearings 164 and 172, so that the axial bearings 164, 168, and 172 cannot move toward the suction end 112 of the compressor 100.

In addition to axially positioning the axial bearings 164 and 172, the wear-preventing and positioning device 192 also substantially prevents any wearing or grooving in the end surface 140 of the discharge housing 136 that could otherwise lead to increased axial rotor end play. As best shown in FIGS. 2 and 3, the device 192 is sandwiched between the end surface 140 and the axial bearings 164, 172 such that no portion of the axial bearings 164, 172 contact the end surface 140.

The device 192 is preferably made from strip steel having a hardness of between approximately 400–600 Vickers (approximately 40–60 Rockwell C), and most preferably has a hardness of approximately 495 Vickers (approximately 50 Rockwell C). The hardness of the wear-preventing and positioning device 192 is approximately equal to the hardness of the outer races 176 of the axial bearings 164 and 172. Therefore, any rotation or misalignment of the axial bearings 164 and 172 will not create any wearing or grooving in the discharge-side face 204 of the device 192. Of course, other materials having the desired hardness can also be used to make the device 192.

Additionally, the configuration of the device 192, and the manner in which it is mounted over the two rotors 104, 108, substantially prevents any relative movement between the device 192 and the end surface 140. Specifically, because the rotors 104 and 108 pass through the respective spaced-apart openings 212 and 216, the device 192 cannot rotate about either rotor 104 or 108 in a plane normal to the longitudinal axes of the rotors 104, 108. Therefore, neither the axial bearings 164, 172 nor the device 192 will cause wearing or grooving in the end surface 140.

Because wearing and grooving in the device 192 itself, or in the end surface 140 cannot occur, the original axial rotor end play will remain substantially unchanged over the operating life of the compressor 100. Thus, there is no need to include the spring-loaded backup bearings or other anti-rotation devices discussed above with respect to the prior art compressor 10.

In the illustrated embodiment, the device 192 is approximately 1 mm thick, however, the thickness can vary proportionally to the axial rotor end play of the compressor 100.

The device 192 is preferably stamped from a roll of strip steel, deburred, and then flattened. In the illustrated embodiment, the discharge-side face 204 and the suction-side face 208 are flattened to a flatness tolerance of approximately 0.02 mm. This tight flatness tolerance ensures that the faces 204 and 208 are substantially parallel so that the engagement between the axial bearings 164, 172 and the discharge-side face 204, the suction-side face 208 and the end surface 140, and the suction-side face 208 and the radial bearings 144, 148 are substantially square. Of course, other methods of fabricating the wear-preventing and positioning device 192 can also be used.

Referring again to FIGS. 2 and 3, the compressor 100 also includes a bearing cover 220 coupled to the end surface 140 of the discharge housing 136 to cover and protect the axial bearings 164, 168, and 172, and to close the discharge end 116 of the compressor 100. In addition, the bearing cover 220 helps locate and position the wear-preventing and positioning device 192 radially inside the compressor 100.

To assemble the components in the discharge end 116 of the compressor 100, the suction housing 120, the rotor housing 132, and the discharge housing 136 are assembled around the rotors 104 and 108. The radial bearings 144 and 148 (or at least the outer races 150 of the radial bearings 144 and 148 if the inner races have been previously mounted on the rotors 104, 108) are inserted into the discharge housing 136 until the suction-side faces 152 engage the shoulders 160. Next, the wear-preventing and positioning device 192 is positioned to abut the end surface 140 by inserting the discharge ends of the rotors 104 and 108 into the respective openings 112 and 116 and sliding the device 192 toward the suction end 112 and into engagement with the end surface 140. The suction-side face 208 of the device 192 also engages the discharge-side faces 156 of the radial bearings 144 and 148 to retain the radial bearings 144 and 148 in the discharge housing 136.

The axial bearings 164, 168, and 172 are then mounted on the respective rotors 104 and 108 such that the suction-side faces 180 of the bearings 164 and 172 abut the discharge-side face 204 of the device 192. Engagement between the axial bearings 164, 172 and the end surface 140 is prevented by the wear-preventing and positioning device 192. With the axial bearings 164, 168, and 172 mounted, the thrust collars 188 are then mounted on the rotors 104 and 108. Finally, the bearing cover 220 is coupled to the discharge housing 136 to protect the components in the discharge end 116 of the compressor 100.

While the wear-preventing and positioning device 192 is shown and described above as being a single piece formed in the shape of a figure-eight, it is understood that the device 192 could also be formed as two separate pieces. For example, the device 192 could be cut in half between the openings 212 and 216. When assembled in the compressor 100, the two separate pieces would preferably engage one another between the rotors 104 and 108, thereby preventing the two separate pieces from rotating in a plane normal to the longitudinal axes of the rotors 104 and 108.

Various features of the invention are set forth in the following claims.

We claim:

1. A screw compressor comprising:
   a suction end;
   a discharge end;
   first and second rotors mounted for rotation between the suction end and the discharge end, each of the first and second rotors being capable of some axial movement with respect to the discharge end;
   a discharge housing at the discharge end and surrounding a portion of the first and second rotors, the discharge housing having an end surface;
   a first axial bearing supporting the first rotor, the first axial bearing having an outer race that is axially movable with respect to the end surface; and
   a wear-preventing member sandwiched between the end surface of the discharge housing and the first axial bearing such that no portion of the first axial bearing can contact the end surface, the wear-preventing member being substantially prevented from rotating with respect to the end surface.

2. The screw compressor of claim 1, further comprising:
   a second axial bearing supporting the second rotor, and
   wherein the wear-preventing member is sandwiched between the end surface of the discharge housing and the second axial bearing such that no portion of the second axial bearing contacts the end surface.

3. The screw compressor of claim 1, wherein the wear-preventing member is substantially figure-eight-shaped.

4. The screw compressor of claim 1, wherein the wear-preventing member includes first and second openings for receiving the first and second rotors, respectively, to position and anti-rotate the wear-preventing member in the screw compressor.

5. The screw compressor of claim 1, further comprising:
   a cover surrounding the first axial bearing and coupled to the end surface of the discharge housing such that the wear-preventing member is radially positioned with respect to the first and second rotors by at least a portion of the cover.

6. The screw compressor of claim 1, wherein the wear-preventing member is a single piece.

7. The screw compressor of claim 1, further comprising:
   a first radial bearing in the discharge housing and supporting the first rotor, the first radial bearing having a suction-side face and a discharge-side face, the suction-side face being seated in the discharge housing, and
   wherein the wear-preventing member includes a first face abutting the end surface of the discharge housing and abutting at least a portion of the discharge-side face of the first radial bearing to retain the first radial bearing in the discharge housing.

8. The screw compressor of claim 7, further comprising:
   a second radial bearing in the discharge housing and supporting the second rotor, the second radial bearing having a suction-side face and a discharge-side face, the suction-side face being seated in the discharge housing, and
   wherein the first face of the wear-preventing member abuts at least a portion of the discharge-side face of the second radial bearing to retain the second radial bearing in the discharge housing.

9. A wear-preventing and positioning member for a screw compressor having first and second rotors supported on a discharge side by respective first and second axial bearings that each have an outer race that is axially movable with respect to the discharge side, the positioning member comprising:
   a body portion having
      a first opening for receiving the first rotor;
      a second opening for receiving the second rotor; and
      a first face engageable with the first and second axial bearings;
   wherein the body portion is substantially prevented from rotating with respect to the bearings because the rotors are receivable in the respective first and second openings.

10. The wear-preventing and positioning member of claim 9, wherein the compressor further comprises respective first and second radial bearings, and wherein the body portion further includes a second face engageable with the first and second radial bearings.

11. The wear-preventing and positioning member of claim 9, wherein the first and second openings are substantially circular.

12. The wear-preventing and positioning member of claim 9, wherein the body portion has a thickness of approximately 1 mm.

13. The wear-preventing and positioning member of claim 9, wherein the first face has a flatness tolerance of 0.02 mm.

14. The wear-preventing and positioning member of claim 9, wherein the body portion is substantially figure-eight-shaped.

15. The wear-preventing and positioning member of claim 9, wherein the body portion is a single piece.

16. The wear-preventing and positioning member of claim 9, wherein the positioning g member is made from strip steel.

17. The wear-preventing and positioning member of claim 16, wherein the strip steel has a hardness of approximately 400–600 Vickers.

18. The wear-preventing and positioning member of claim 17, wherein the strip steel has a hardness of approximately 495 Vickers.

19. The wear-preventing and positioning member of claim 9, wherein the compressor further includes a discharge housing having an end surface, wherein the wear-preventing and positioning member includes a second face, and wherein the second face is engageable with the end surface.

20. The wear-preventing and positioning member of claim 19, wherein the body portion is sandwiched between the end surface of the discharge housing and the first and second axial bearings such that no portion of the first and second axial bearings contacts the end surface.

21. A method of assembling a screw compressor having first and second rotors and a discharge housing surrounding a portion of the first and second rotors, the discharge housing having an end surface, the method comprising:
   inserting first and second radial bearings into the discharge housing to support the respective first and second rotors;
   placing a wear-preventing and positioning device against the end surface of the discharge housing to retain the radial bearings in the discharge housing; and
   mounting first and second axial bearings on the respective first and second rotors such that the first and second axial bearings each have an outer race movable axially with respect to the end surface and such that the first and second axial bearings can abut the wear-preventing and positioning device so that the wear-preventing and positioning device substantially prevents engagement between the first and second axial bearings and the end surface of the discharge housing;
   wherein the wear-preventing and positioning device includes first and second apertures, and wherein the step of placing the wear-preventing and positioning device against the end surface of the discharge housing includes passing the first and second rotors through the first and second apertures as the wear-preventing and positioning device is placed against the end surface of the discharge housing so that the wear-preventing and positioning device is substantially prevented from rotating by the first and second rotors passing therethrough.

22. The method of claim 21, wherein placing a wear-preventing and positioning device against the end surface of the discharge housing includes placing a one-piece wear-preventing and positioning device against the end surface of the discharge housing.

* * * * *